Oct. 11, 1932.  G. C. TROTTER  1,882,100
MEANS FOR AND METHOD OF MAKING LOCK WASHERS
Filed Jan. 7, 1931   11 Sheets-Sheet 7

Inventor:
George C. Trotter
By Cheever, Cox & Moore
Attys.

Oct. 11, 1932.  G. C. TROTTER  1,882,100
MEANS FOR AND METHOD OF MAKING LOCK WASHERS
Filed Jan. 7, 1931  11 Sheets-Sheet 9

Inventor:
George C. Trotter
By Cheever, Cox & Moore
Attys.

Oct. 11, 1932.    G. C. TROTTER    1,882,100
MEANS FOR AND METHOD OF MAKING LOCK WASHERS
Filed Jan. 7, 1931    11 Sheets-Sheet 10
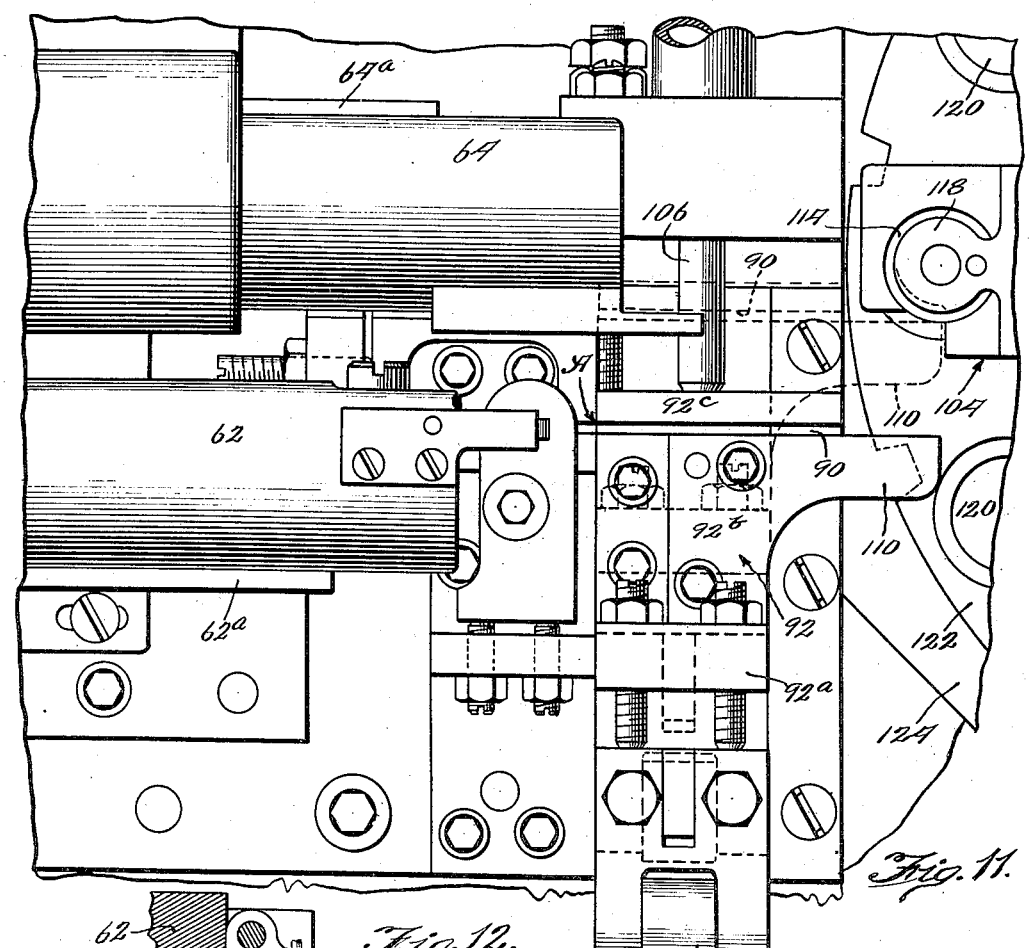
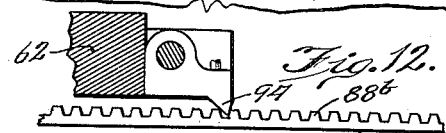
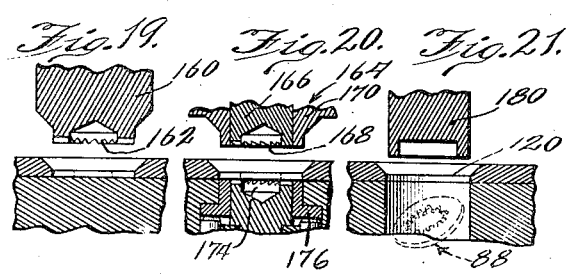

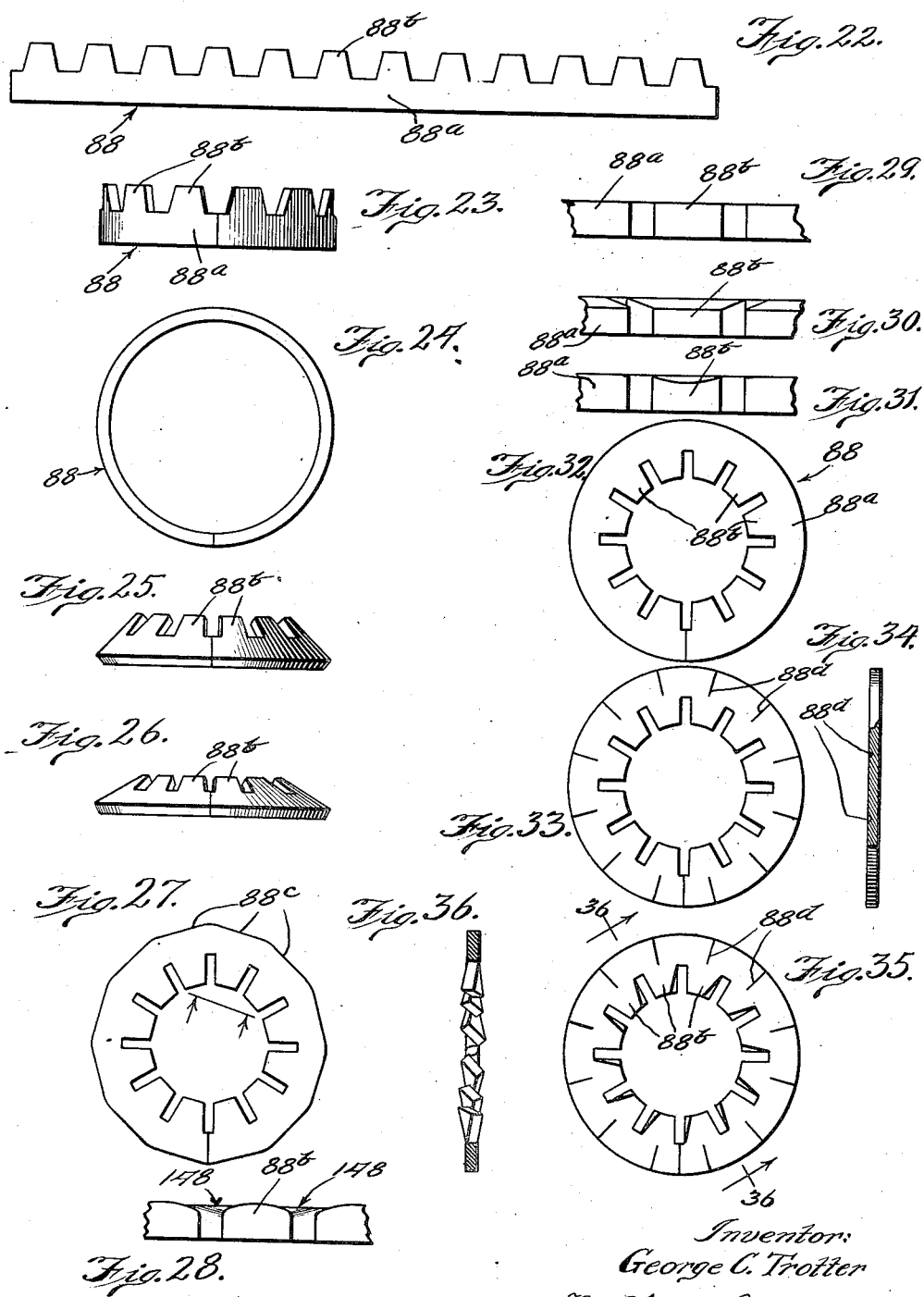

Patented Oct. 11, 1932

1,882,100

UNITED STATES PATENT OFFICE

GEORGE C. TROTTER, OF CHICAGO, ILLINOIS, ASSIGNOR TO SHAKEPROOF LOCK WASHER COMPANY, OF CHICAGO, ILLINOIS, A CORPORATION OF DELAWARE

MEANS FOR AND METHOD OF MAKING LOCK WASHERS

Application filed January 7, 1931. Serial No. 507,084.

My invention relates generally to means for and methods of making lock washers, and more particularly to apparatus and methods relating to the manufacture of pronged lock washers from strip material.

It is one of the primary objects of my present invention to provide improved means and methods, whereby lock washers and articles of like nature may be manufactured with a minimum amount of loss resulting from scrap, and whereby said washers may be produced in a more facile and economical manner.

Another object of my present invention is to provide means and methods, whereby lock washers of the pronged type may be produced with extreme accuracy so that the resulting washers will be uniform in structural characteristics, and hence uniform in locking effectiveness when subjected to practical use in the field.

A further and more specific object of my present invention is to provide an improved and effective means and method, whereby lock washers may be rapidly and accurately produced from a single strip of serrated flat stock, and to this end I propose to provide said serrated stock by severing a single strip of material into two identical serrated strips, severing a predetermined length of one of said strips in accordance with the size of the washer to be produced, coiling said severed section so as to produce a single convolution with the serrations extending axially thereof, and subsequently forcing said serrations or prongs inwardly so as to present a lock washer having a marginal body portion and a plurality of locking prongs extending inwardly therefrom.

Still more specifically, it is an object of my present invention to provide means and methods, whereby the above mentioned steps may be practiced in immediate succession so that said serrated strip may be successively advanced, severed, and formed into the desired washer, so that washers may be completed in rapid succession.

In addition to the above mentioned objects, my invention contemplates the provision of a new and improved machine, whereby the above mentioned and other steps of my improved methods may be practiced, said machine being so designed as to enable the rapid production of accurately formed pronged lock washers from a strip of serrated stock.

A still further object of my invention is to provide a reciprocable punching mechanism which is provided with a plurality of stations for receiving sections of severed serrated stock, whereby, during each cycle of reciprocation of the punching mechanism, forming operations will be simultaneously performed on a plurality of sections of serrated stock, each section being positioned at one of said stations.

The foregoing and numerous other objects and advantages will be more apparent from the following detailed description when considered in connection with the accompanying drawings, wherein—

Figure 11 is an enlarged fragmentary plan view of the reciprocable strip feeding mechanism to more clearly illustrate the manner in which a predetermined length of serrated stock is severed and laterally shifted into registration with the coiling station;

Figures 12 to 21 inclusive fragmentarily disclose mechanisms which are employed to perform operations on successive strips of serrated stock from the time said strip is fed in its elongated state into the coiling mechanism until it is finally ejected from the machine as a completed pronged lock washer;

Figure 22 is an enlarged view of one form of serrated strip material, which is capable of being formed into a lock washer by employing my improved machine and method;

Figure 23 discloses the strip of Figure 22 formed into a single convolution;

Figure 24 is a view of the underside of Figure 23;

Figure 25 discloses the washer after being engaged by the plunger shown in Figure 14;

Figure 26 discloses the washer after the action of the plunger of Figure 15;

Figure 27 shows the washer after it has been flattened by the plunger of Figure 16;

Figure 28 is an enlarged end elevational view of one of the prongs of Figure 27 to disclose the effect which is produced upon the serrations or teeth when the stock is initially formed into a serrated strip;

Figures 29, 30, and 31 are enlarged end views of the prongs similar to Figure 28 and disclose the results which may be obtained by the use of a plunger of the type shown in Figure 17. Figure 29 discloses a prong which is of substantially equal thickness throughout its length, and Figure 30 discloses a prong which has been tapered toward its outer extremity, while Figure 31 discloses a prong which has been formed with a concave surface;

Figure 32 discloses the washer after it has been acted upon by the plunger of Figure 18, said plunger serving to force the washer stock outwardly against the walls of a circular nest, and thereby insure a perfect circular contour along the outer margin of the washer body and also to size the central aperture of said washer;

Figures 33 and 34 disclose the washer provided with slight indentations or notches which are produced by the plunger of Figure 19 and serve to resiliently urge the abutting extremities of the washer together and thereby counteract any tendency to spring apart; and Figure 35 and Figure 36, which is a sectional view taken substantially along the line 36—36 of Figure 35, disclose the final forming operation, namely, that of warping or flexing the washer teeth out of the plane of the washer body, and this may be accomplished by employing the plunger shown in Figure 20, which also serves to flatten the body of the washer.

Figure 1:
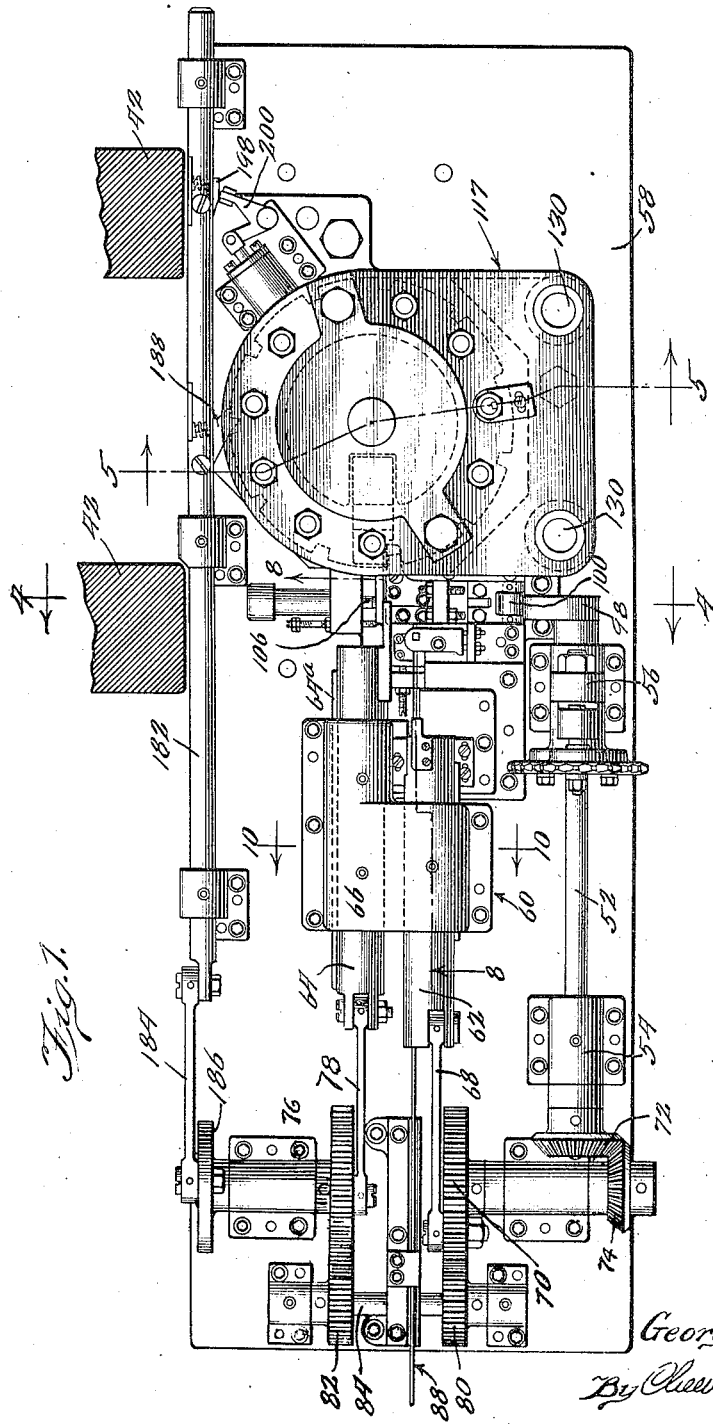
Figure 1 is a plan view of a machine which is representative of one means, whereby my improved method of producing lock washers may be effectively practiced.
Figure 2:
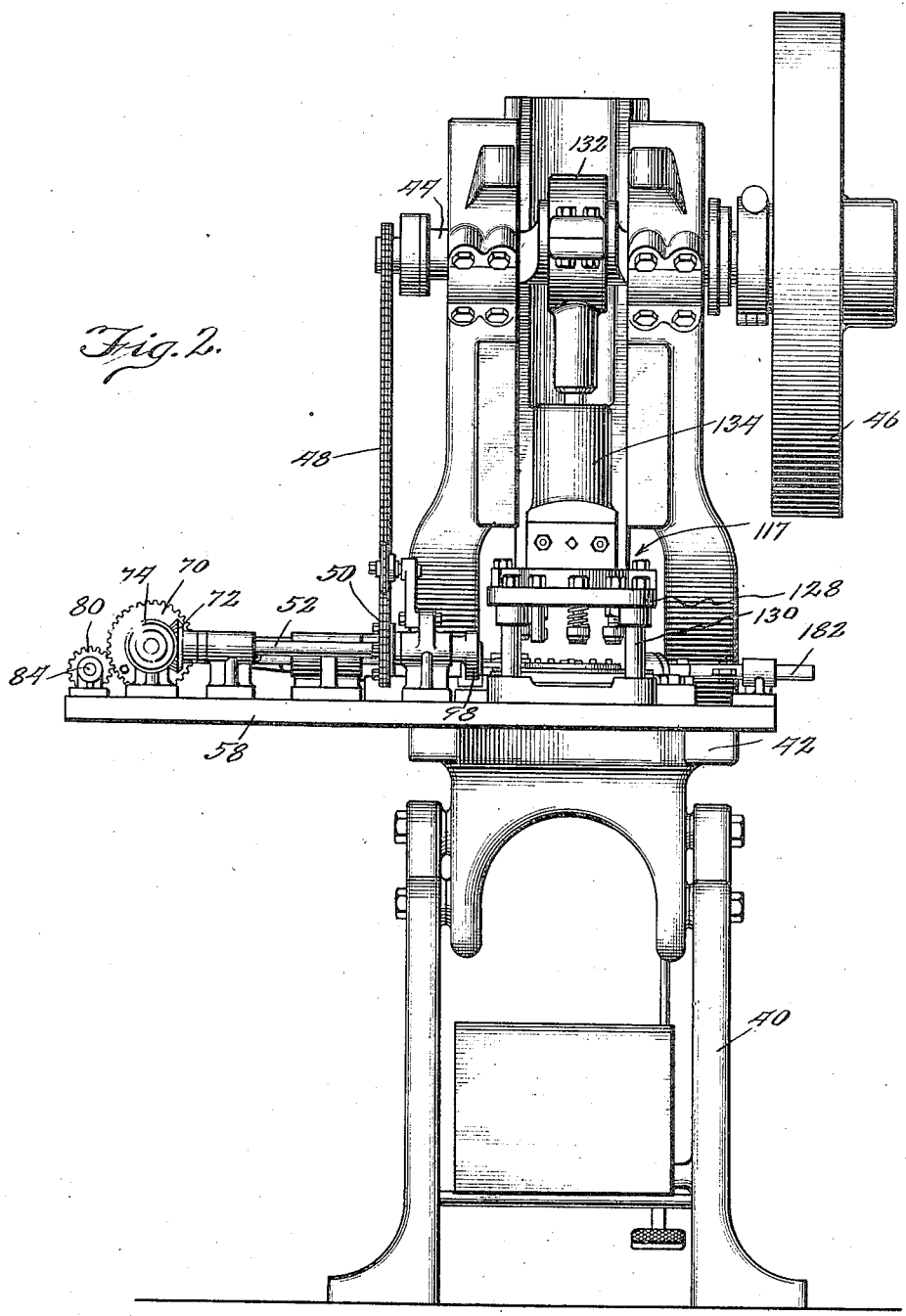
Figure 2 is an enlarged elevational view of the machine as viewed from the front of Figure 1.
Figure 3:
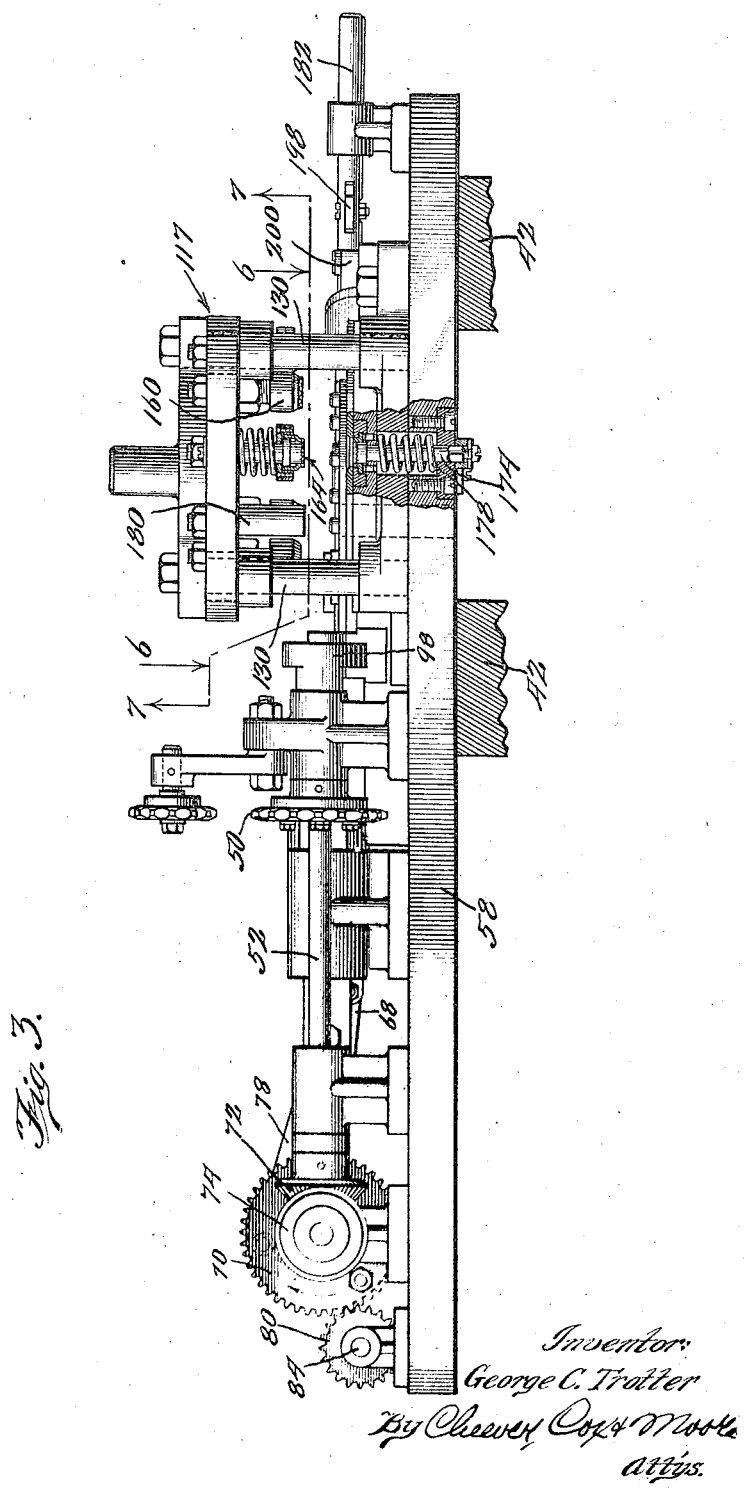
Figure 3 is a fragmentary elevation as viewed from the front of Figure 1, a portion of the punching mechanism being broken away to more clearly illustrate certain structural features thereof.
Figure 4:
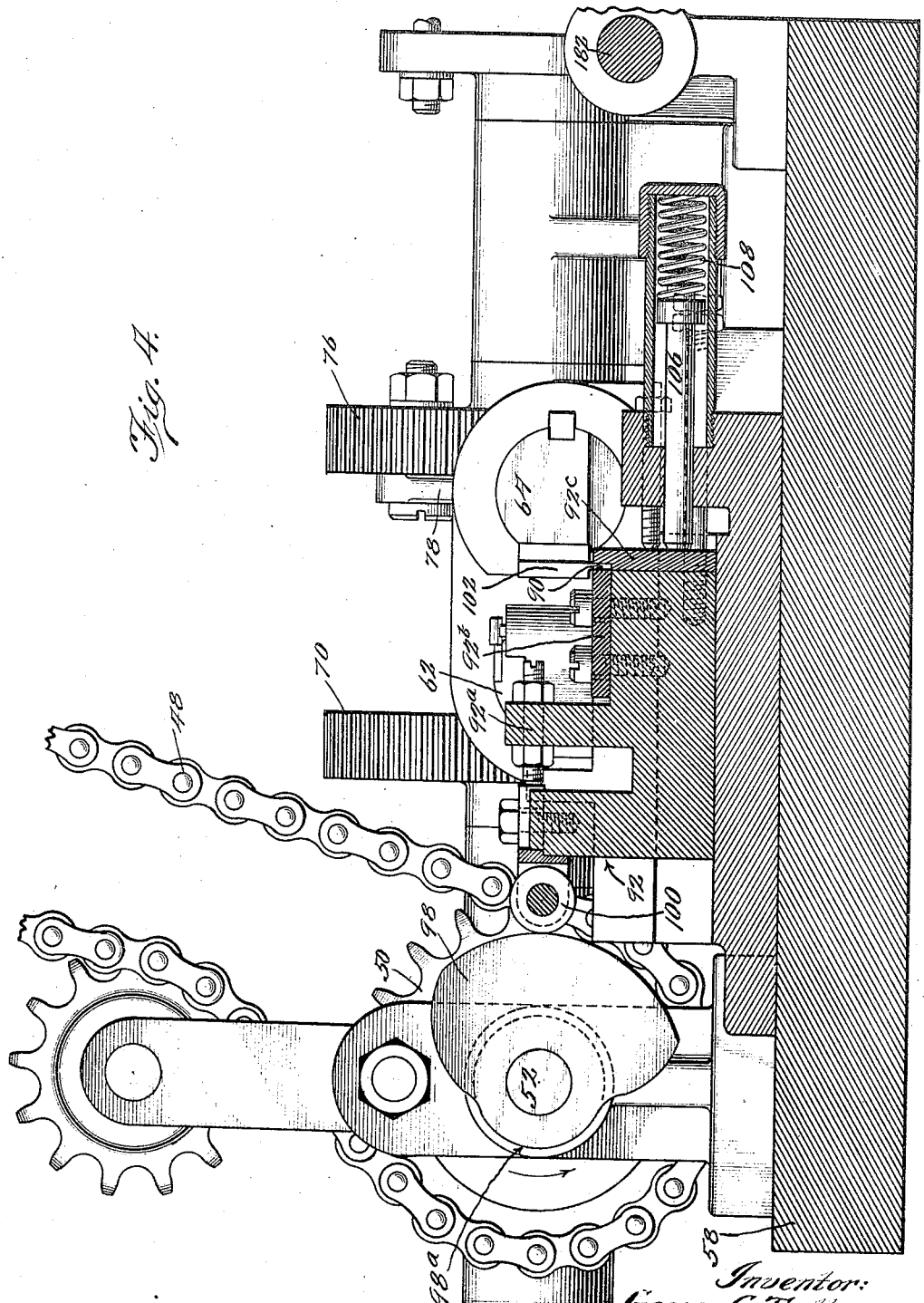
Figure 4 is an enlarged transverse sectional view of the machine taken substantially along the line 4—4 of Figure 1.

Referring now to the drawings more in detail, wherein like numerals have been employed to designate similar parts throughout the various figures, it will be seen that for the purpose of more clearly setting forth my improved method of producing lock washers, I have disclosed a machine, whereby said method may be effectively practiced, and the particular embodiment disclosed in the drawings includes a suitable base 40, Figure 2, which supports an upper frame 42, Figures 1, 2, and 3. This frame 42 extends upwardly on one side thereof to support a suitable drive shaft 44, Figure 2, which carries a fly-wheel 46. Power may be imparted to this shaft 44 from any suitable source (not shown), and this power is transmitted from the shaft 44 through the medium of a chain 48, which drives a sprocket wheel 50, Figures 1 to 4 inclusive. The sprocket wheel 50 is mounted upon a drive shaft 52, and this shaft is mounted in suitable brackets 54 and 56, which are mounted upon a bed plate 58.

A strip feeding mechanism designated generally by the numeral 60, which includes a pair of reciprocable bars 62 and 64 and a housing 66, is mounted upon the bed plate 58. Reciprocation is imparted to the bar 62 through the agency of a link 68, which is interposed between said bar and a gear 70. This gear 70 is driven from the drive shaft 52 through the agency of a pair of bevel gears 72 and 74. The reciprocable bar 64 is similarly connected with a gear 76 through the agency of a link 78, and this gear is driven from the gear 70 through the agency of gears 80 and 82 mounted upon a shaft 84. The extremities of the links 68 and 78 are eccentrically positioned with respect to the axis of their respective gears 70 and 76 so as to effect the proper timing and stroke of the bars 62 and 64, as will later be described.

Figure 8:
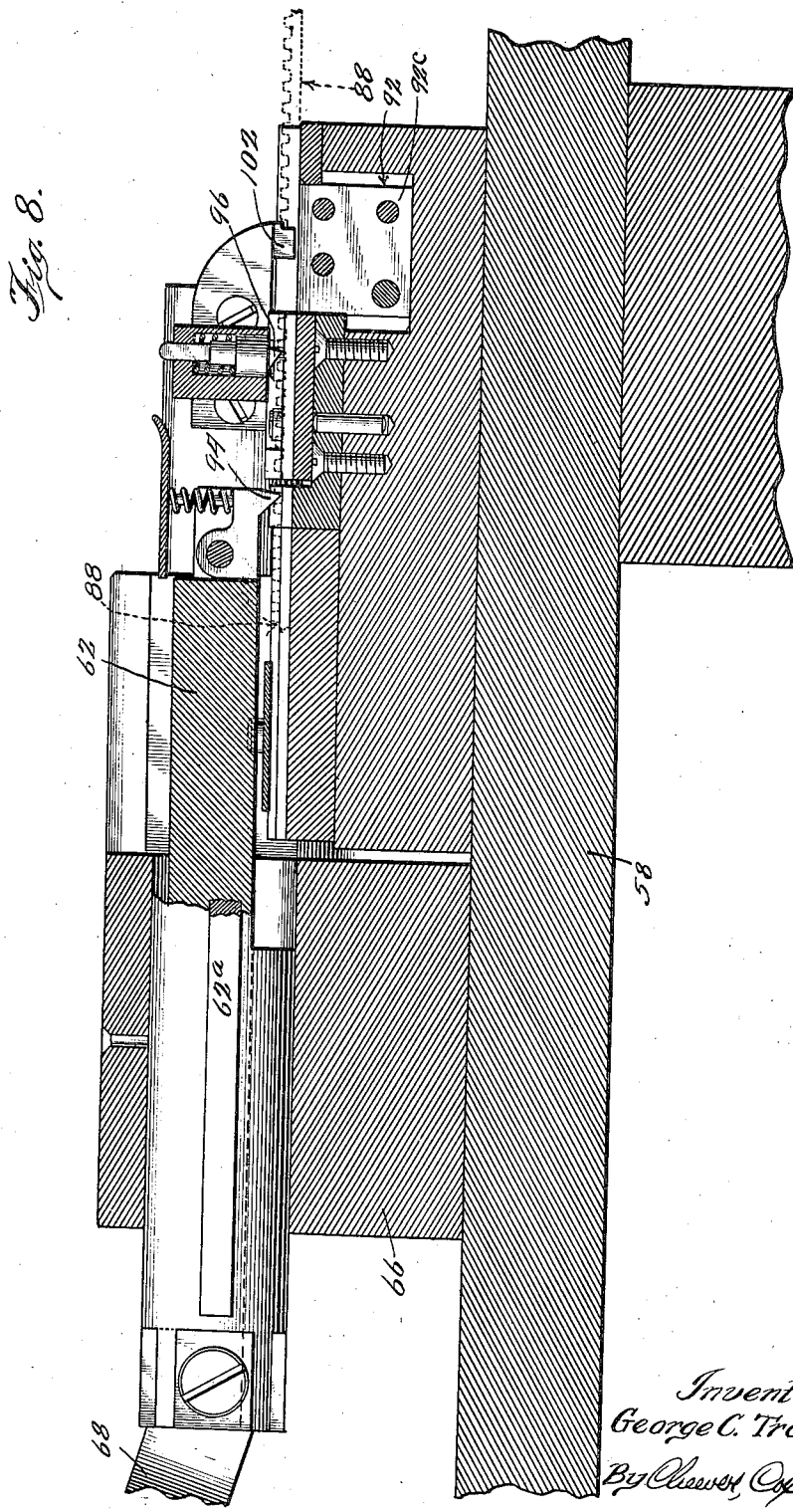
Figure 8 is an enlarged longitudinal sectional view of the reciprocable strip feeding mechanism, said view being taken substantially along the line 8—8 of Figure 1.
Figure 10:
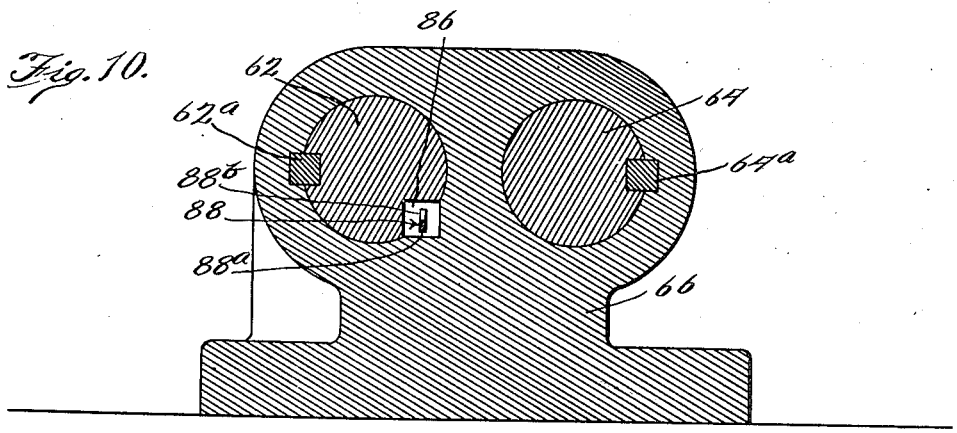
Figure 10 is an enlarged transverse sectional view of the reciprocable strip feeding mechanism taken substantially along the line 10—10 of Figure 1.

It will be noted that in Figure 10 the bar 62 is provided with a longitudinal recess or notch 86 which is adapted to receive a strip of serrated stock 88, said stock comprising a body portion 88a and a plurality of serrations or prongs 88b extending along the upper margin thereof (see Figure 22). This stock 88 is initially inserted within the left end of the bar 62, as viewed in Figures 1 and 8, until the advancing end of the strip is positioned within the right extremity of a strip-receiving slot 90 shown clearly in Figure 11. This slot 90 is formed within a stripper carriage 92, which is transversely reciprocable with respect to the axis of the bar 62. When the stock is initially positioned within the slot 90 as described, the prongs or teeth 88b of the stock will click past a resiliently depressed finger 94 and a resiliently depressed finger 96. The finger 94 is pivotally carried by and is reciprocable with the bar 62 and serves to intermittently advance stock into the slot 90 of the stripper carriage 92. The function of the finger 94 will be clearly apparent from the disclosure in Figure 12, wherein said finger is shown in operative association with one of the prongs 88b. During the reverse or left movement of the bar 62, the finger 94 will click past the prongs 88b, and during this interval the resiliently depressed finger 96 will interlock with the prongs 88b so as to prevent the stock from being urged outwardly from its position within the stripper carriage slot or recess 90. It will be apparent, however, that during the advancing stroke of the finger 94, the finger 96 will permit the prongs 88b to click past it.

Assume that the serrated stock 88 has been moved into position within the slot 90 and that the bars 62 and 64 are functioning in timed relation. As the bar 62, which carries the finger 94, is moved rearwardly to the left, the stripper carriage 92 is urged to the right, Figure 4, through the agency of a cam 98 carried by the drive shaft 52 and a follower roller 100 supported by the carriage. The forward movement of the carriage causes the section of stock now positioned within the slot 90 thereof to be sheared from the remaining section of stock at the point designated by the letter A, Figure 11. This severed section of stock is advanced until the carriage reaches the dotted line position shown in Figure 11 and also the solid line position shown in Figure 4. The bar 64 is at this interval advancing toward the carriage and a depending finger 102 supported at the advancing end of the bar 64, Figure 8, engages the left end of the stock within the carriage and urges it into association with a coiling mechanism or station designated generally by the numeral 104, later to be described. Upon completion of the advancing stroke of the bar 64, a plunger 106 and a cooperating spring 108, Figure 4, act upon the carriage 92 and thereby effect a sudden reverse movement so that, as the bar 64 begins its movement to the left, said carriage will be clear of the depending finger 102. A low cylindrical surface 98a of the cam 98, Figure 4, cooperates with the roller 100 to retain the carriage 92 in its strip-receiving position shown in Figure 11 for a sufficient time to permit the finger 94 of the bar 62 to advance a section of stock into the slot 90.

Figure 9:
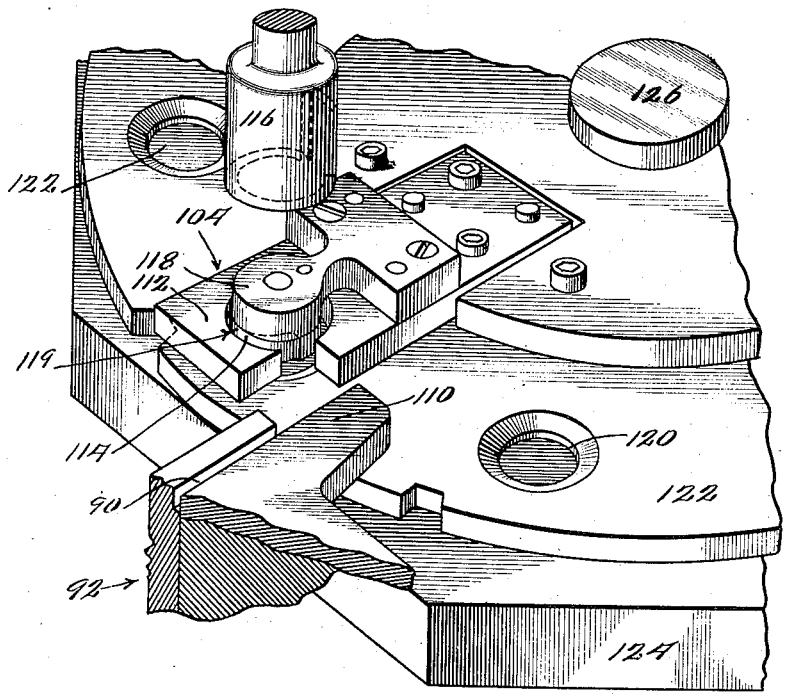
Figure 9 is a fragmentary enlarged perspective view of the strip coiling station and associated mechanism.

The coiling mechanism or station 104 referred to above is more clearly shown in the perspective view of Figure 9. In this figure the carriage 92 is disclosed as approaching its limiting advanced position and as it reaches this position, a projection 110 of the carriage 92, Figures 6 and 9, is so positioned with respect to the adjacent portions of a plate 112 of the coiling mechanism 104 as to direct the section of stock advanced through the slot 90 by the depending finger 102 into a coiling chamber or passageway 114. The length of this coiling chamber or passageway 114 corresponds with the length of the severed section of stock, and upon the completion of this coiling operation a hollow plunger 116, which forms a part of a plunger or punch mechanism 117, Figures 5, 7, and 9, is moved downwardly over a cylindrical projecting bracket 118, which supports a forming arbor or die 119, so as to effect downward ejection of the severed convolution 88 from the coiling mechanism into a recess 120 of an indexing plate 122.

Figure 5:
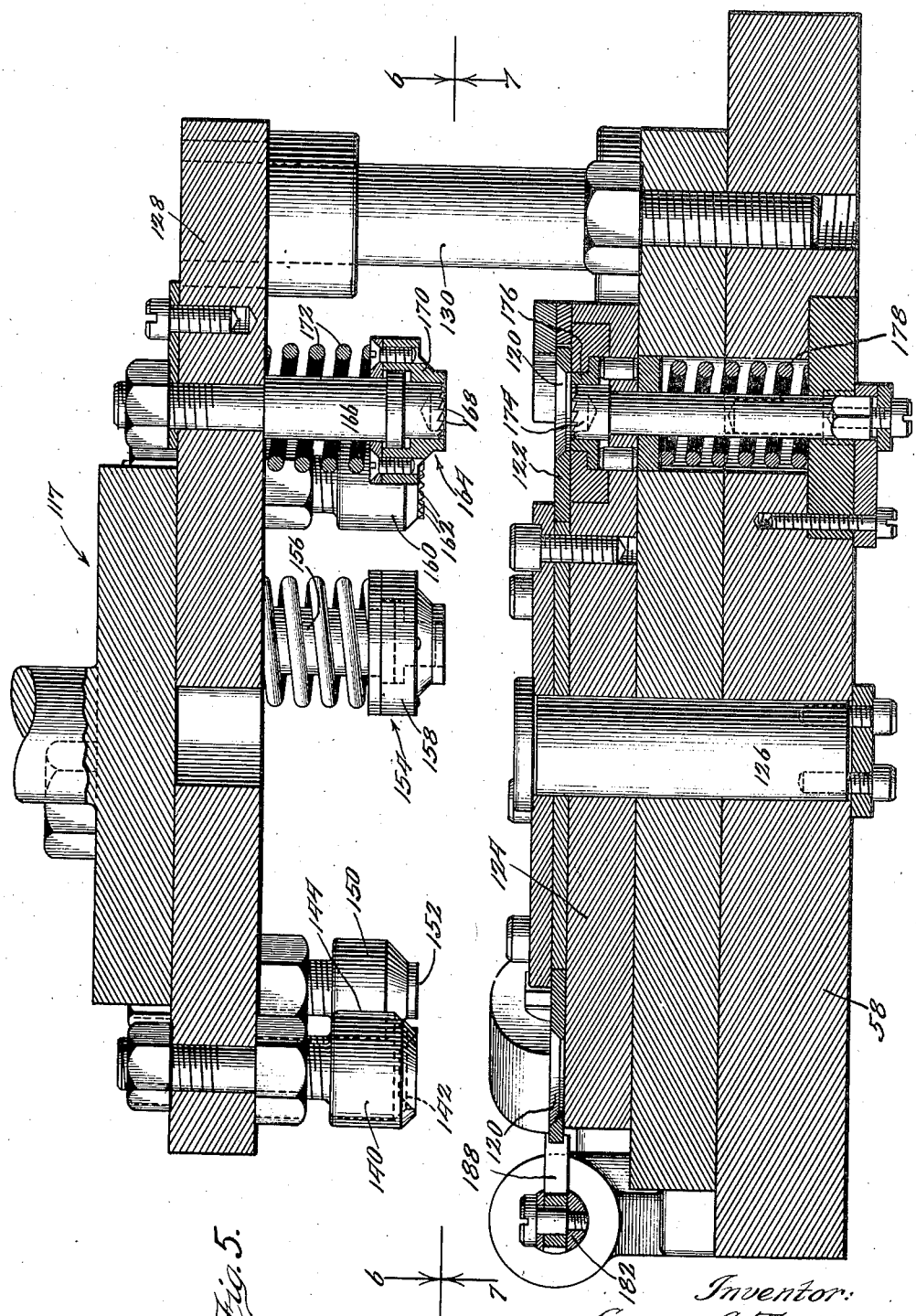
Figure 5 is an enlarged transverse sectional view of the punching mechanism taken substantially along the line 5—5 of Figures 1, 6, and 7.
Figure 6:
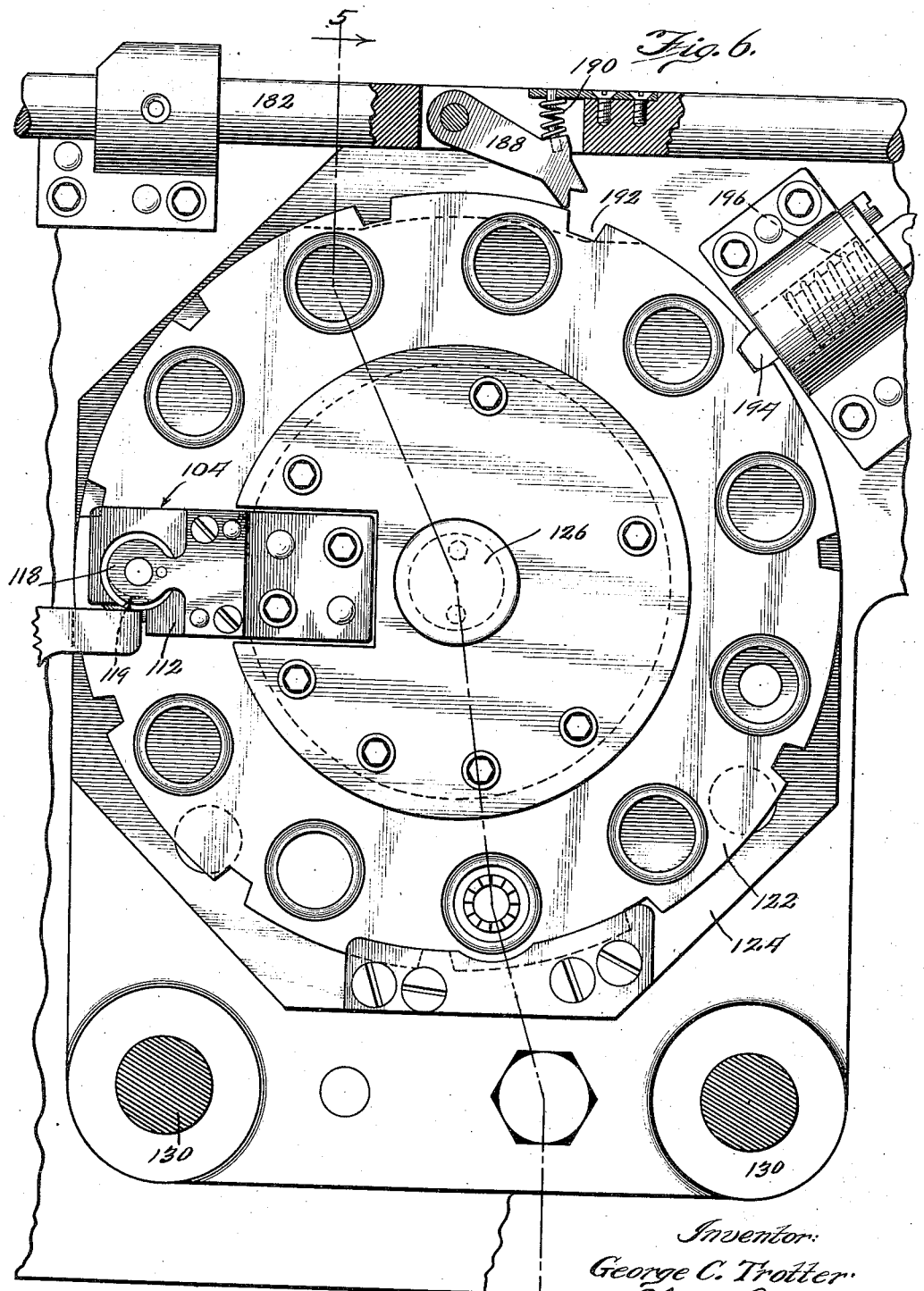
Figure 6 is a horizontal sectional view of the punching mechanism taken substantially along the line 6—6 of Figure 5 to disclose the relative positions of the various strip forming stations.

This indexing plate or disk 122 rests upon a plate 124, and is horizontally rotatable about a central pin or shaft 126, Figures 5 and 9. The indexing disk 122 is provided with a plurality of the above mentioned recesses 120, said recesses being equally spaced along the plate and equally distanced from the axis of the pin 126. As the coiled strip 88, Figure 23, is forced out of the coiling mechanism 104, the body portion 88a of said strip is snugly received by the inner cylindrical surface surrounding the recess 120. It will be noted that the recesses 120 are also provided with tapered side walls to facilitate the directing of the serrated strip 88 into the inner cylindrical portion of the recess.

After the hollow ejecting plunger 116 is raised from the recess 120 which now contains the convolution of strip material 88, the plate or disk 122 is indexed in a clockwise direction as viewed in Figures 1, 6, and 9, so as to bring the next following recess of the plate into registration beneath the coiling mechanism 104. The mechanism for indexing the disk 122 will be described later. In order to obtain a clear understanding of the subsequent forming operations to which the coiled strip 88 is successively subjected, I shall now proceed to describe the remaining plungers and the like, which comprise the plunger mechanism 117. At this point it should be noted that the mechanism 117 includes a suitable plunger supporting member 128, Figures 5 and 7, and this member 128 is vertically reciprocable along suitable guide pins 130. The reciprocation of the plunger mechanism 117 is occasioned through the agency of a suitable eccentric device 132, Figure 2, which is actuated by the main drive shaft 44, said eccentric mechanism 132 being connected with a reciprocable plunger head 134 which supports the member 128.

Figure 7:
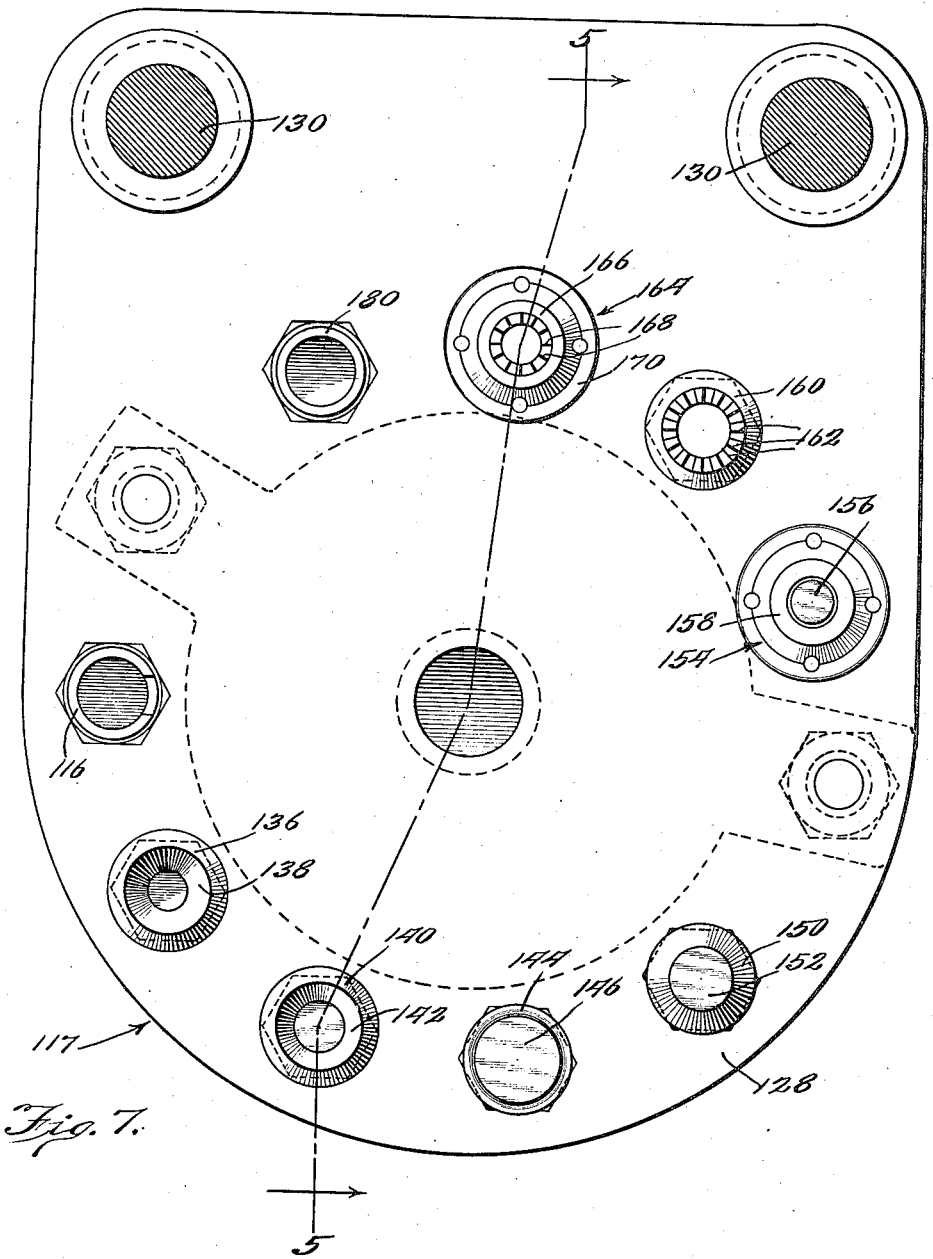
Figure 7 is a view taken substantially along the line 7—7 of Figure 5, of the end of the punching devices which are companion to the various forming stations disclosed in Figure 6.

As the disk 122 is indexed, as above set forth, the coiled strip 88 having the prongs thereof extending in an axial direction, is moved into position beneath a second plunger 136, Figures 5 and 7. This plunger 136 which is supported at its upper end by the plate 128, as clearly shown in Figure 5, is formed with an internal conical surface 138, and this surface upon engaging the upwardly extending prongs of the strip 88 causes said prongs to be deflected inwardly so as to assume the position shown by the dotted lines in Figure 14 and as shown by the full lines in Figure 25. The included angle of the upper surface of the washer or strip as shown in these figures is approximately 90 degrees.

Upon the completion of the above operation, the plate 122 is indexed so as to bring the washer beneath a plunger 140 which is also formed with an internal conical surface 142. The engagement of this surface with the work causes the prongs to be deflected inwardly to a further degree, so that the included angle of the washer is approximately 120 degrees (see dotted lines, Figure 15, full lines, Figure 26). A subsequent indexing of the disk 122 carries the washer beneath another plunger 144. This plunger is provided with a lower flat surface 146 which serves to completely flatten the washer, thereby presenting a structure similar to that shown in Figure 27.

At this point reference is made to Figure 28, wherein an enlarged end view of a prong of the washer of Figure 27 is disclosed. It will be seen that rounded edges 148 are shown along one side of the prongs 88b, and these rounded edges are formed at the time the serrated strip 88 is initially formed. This strip is preferably formed by cutting a single strip into two symmetrically formed parts by a suitable shearing operation. The shearing of the strip material frequently forms a rounded or dull edge along one side of the prong, but does not impair the sharpness of the opposite edge. To avoid the presence of these rounded edges in the completed washer, I subject the washer in the next operation to the action of a plunger 150, which is provided with a suitable surface 152. The surface 152 is less in diameter than the diameter of the washer, and may be formed to produce a flat tooth as shown in Figure 29, a tapered tooth as shown in Figure 30, or a tooth having one concave surface as shown in Figure 31. In any event this plunger 150 serves to remove the dull or rounded edges from the prongs 88b. When the washer is indexed to the next station, another swedging operation is performed by a plunger mechanism designated generally by the numeral 154, Figures 7 and 18. This mechanism includes a central plunger 156 and a surrounding plunger 158. The surrounding plunger 158 engages the upper surface of the washer and the central plunger 156 is forced into the central aperture of the washer and against the inner surfaces of the prongs 88b. This causes the body portion of the washer to be urged outwardly against the cylindrical wall of the recess 120, and in this manner any irregularity in the peripheral surface of the washer, as, for example, the flat surfaces 88c shown in Figure 27 are removed. In other words, the desired circular form of the peripheral surface of the washer, as shown in Figure 32, is obtained. The central plunger 156 also serves to properly size the central aperture of the washer, and this feature is important in instances where tolerances are relatively small.

When the washer is advanced to the next station, a punch or plunger 160 having a plurality of serrations 162, Figure 19, is moved into engagement with the body portion 88a of the washer, thereby making slight depressions or indentations 88d, Figures 33 and 34. By scoring the body of the washer in this manner, the abutting ends of the washer are sprung toward each other and thereby counteract any tendency to spring them apart. In fact, by subjecting the stock to this scoring operation, said stock is actually elongated sufficiently to cause the firm abutment of the abutting ends thereof.

Upon being moved to the next station, the washer is engaged by a plunger mechanism 164, Figures 5 and 20 which includes a central plunger 166 having a plurality of angularly disposed teeth 168 and a surrounding plunger section 170. These teeth 168 when moved into engagement with the prongs or teeth 88b impart a warp or twist to the teeth so as to position work engaging edges out of the plane of the washer body. The plunger 168 is secured in a fixed position to the member 128, Figure 5, and the surrounding section 170 is urged downwardly through the action of a coil spring 172. A second toothed plunger 174 is supported beneath the indexing disk 120, and the teeth of this plunger 174 cooperate with the teeth 168 in imparting a twist to the washer prongs. Surrounding the plunger 174 is a collar 176 which cooperates with the plunger section 170 in gripping the body portion of the washer. This collar 176 is constantly urged upwardly through the action of a coil spring 178.

As the washer is indexed to the next and final ejecting station, a plunger 180, Figure 21, moves downwardly so as to eject the washer from the recess 120. The ejected washer is conducted by any suitable means (not shown) to a suitable receptacle.

The intermittent movement or indexing of the disk 120 is accomplished by means of a receptacle rod 182, Figures 1 and 6. The left extremity of this rod has a pivotal connection with one end of a link 184, Figure 1, the opposite extremity of said link being connected with a disk 186. This disk 186 rotates in unison with the gear 76, and the eccentric positioning of the link 184 with respect to the axis of the disk determines the stroke of the shifter rod 182. This rod pivotally supports a pawl 188 which is continuously urged toward the disk 122 by means of a coil spring 190. During the forward movement of this rod 182, the pawl 188 engages one of a plurality of equally spaced notches 192 in the disk 122, and thereby causes said disk to be urged in a clockwise direction as viewed in Figures 1 and 6. Each advancement of the pawl 188 is such as to move the recesses 120 of the disk into successive registration with the stations on the plunger mechanism 117. In order to prevent inadvertent shifting or movement of the disk, I provide a latch member 194, which is constantly urged toward the disk by means of a coil spring 196. This latch 194 is adapted to interlock with the notches 192, and thus serve to secure the disk in position after the indexing pawl 188 has shifted said disk into proper position with respect to the plunger stations. In order to disengage the latch member 194 at the proper interval so as to permit the pawl 188 to index the plate, I provide a lug 198 which is carried by the shifter rod 182 and is adapted to engage a bellcrank 200. The shifting of this bellcrank to the right, Figure 1, causes the latch member 194 to be withdrawn from engagement with a companion notch of the disk. The disengagement of the latch member takes place immediately upon the starting of the indexing stroke of the pawl 188, and upon the reversal of the pawl, the lug 198 is moved over the adjacent end of the bellcrank 200 without disturbing the position of the latch member 194. It will be noted that the lug 198 is pivoted and spring-urged in order to enable said lug to clear the end of the bell-crank 200 without disturbing the position of the latch member 194.

From the foregoing it will be apparent that in practicing my improved method by the use of the above described machine, a strip of flat spring stock is first divided by a suitable sheering operation into two serrated strips, namely, the strips 88 which comprise a body portion 88a and a plurality of prongs or serrations 88b. One of these strips is introduced within the reciprocable feed bar 62 with the prongs thereof uppermost. In this connection it will be noted that the feed bar 62 is provided with a key 62a to guide said bar during its movement, and the guide bar 64 is provided with a key 64a. Power supplied by the roller chain 48 is delivered to the drive shaft 52, and through the action of the gears 70 and 76 timed reciprocation is imparted to the bars 62 and 64, as well as timed reciprocation to the indexing pawl 188. The advanced end of the introduced stock is moved into the slot 90 of the sheering or stripping carriage 92, Figure 11, through the action of the yieldably depressed finger 94, Fig. 8, and the finger 96 prevents the rearward movement of the stock as the finger 94 is shifted in a reverse direction. At this interval the cam 98, acting against the roller follower 100, Figure 4, causes the carriage 92 to be advanced, thereby severing a predetermined length of stock, such as the section 88 shown in Figure 22. In this connection it will be noted that the stock is severed midway of one of the spaces between the prongs so that, when the ends of the strip sections are moved into abutting relation, a space at the abutting portions will be equal to the remaining spaces. This severed section of serrated stock 88 is moved laterally into the path of the advancing finger 102, Figure 8, of the reciprocable feed bar 64, and this finger causes the strip section to be moved into the coiling mechanism 104. In this coiling mechanism, Figure 9, the stock is formed into a single convolution, and the projection 110 of the carriage 92 facilitates the guiding of the strip into said coiling mechanism. The carriage 92 is suddenly reversed, due to the action of the coil spring 108, and the plunger 106, Figure 4, which cooperates with the low point of the cam 98 in effecting the rearward movement of the carriage. In this connection it will be observed that the carriage includes a main block 92a and a pair of plates 92b and 92c, Figure 4, which present the slot or recess 90 for receiving the serrated strip section when the carriage occupies the position shown in Figure 11. Upon the rearward movement of the carriage 92 and the simultaneous rearward movement of the bar 64, the eccentric mechanism 132, Figure 2, functions to lower the punching mechanism 117. This carries the hollow plunger 116 downwardly against the coiled strip section and ejects said section from the coiling mechanism or station and forces it downwardly into the recess 120 of the indexing plate 122. The indexing pawl 188 now functions to shift the disk 120 so as to move the next following recess 120 into position beneath the coiling mechanism and to move the first mentioned recess carrying the strip of stock into position beneath the station which includes the plunger 136, Figure 14. During this movement of the hollow plunger 116 and the disk 122, a second section of serrated stock is being severed and advanced toward the coiling station. Thus, when the punching mechanism 117 is again moved downwardly, a second strip section will have been positioned within the coiling mechanism, and the first strip section will be acted upon by the plunger 136 so as to deflect the prongs and body portion of the washer stock inwardly, as shown in Figures 15 and 25. Upon successive indexing of the disk 122, the remaining forming operations, described above and clearly shown in Figures 15 to 20 inclusive, are performed. As the completed washers reach the final station which includes the ejecting plunger 180, Figure 21, they are automatically ejected from the plate 122.

Thus it will be apparent from the foregoing description that, upon each cycle of operation of the machine, a lock washer will be completed and ejected from the machine. In this manner I am able to very accurately produce lock washers of the pronged type in quick and continuous succession. Strip material may be continuously fed to the machine at one end and completed washers delivered at the opposite end. The arrangement of the forming stations as described above presents a very practical construction and the punches are conveniently positioned for purposes of replacement or repair.

In the strip material from which the lock washers are formed, the grain extends longitudinally thereof. In other words, the grain in the strip 88 extends longitudinally of the body portion 88a. In this connection it should be noted that in employing my machine to practice the above described method, the strip material is bent in such a manner as not to destroy the longitudinal disposition of the fibers or grain of the material with respect to the stock. That is to say, when the stock is bent flatwise so as to present the convolution shown in Figure 23, the grain of the material extends longitudinally thereof. This should be clearly distinguished from lock washers blanked from flat stock wherein the grain in the completed washer naturally traverses the body thereof and does not extend concentrically. It should also be noted that, in flattening the washer from the shape shown in Figure 23 to the shape shown in Figure 32, I do not impair the concentric disposition of the grain. In fact, the body portion and prongs of the stock, in shifting from the position shown in Figure 23 to the flat position shown in Figure 32, turn or rotate about axes which are parallel with the grain of the stock. In this manner I am able to maintain the concentric disposition of the grain in the stock.

Attention is also directed to the fact that in practicing my method the strip material is coiled flatwise and not edgewise. Considerably less force is required in coiling strip stock flatwise than is required to coil similar material edgewise. It will be observed that I am not confronted with the problem of properly alining the abutting ends of the severed section of serrated stock because said stock is coiled flatwise and not edgewise. At this point it should be understood that my method of flatwise coiling and subsequently flattening a strip of stock, is not limited to the manufacture of washers having serrations or prongs therein, but may be used in any instance where washers of an annular type are required. In fact, plain type washers having no locking teeth may be effectively produced by practicing the above described method. My invention is in no sense limited to any particular method of feeding strip material into the coiling mechanism, or to any particular method of manufacturing the strip material.

It should be understood that the invention is in no sense limited to any particular design of lock washers, such as a lock washer having any specific form of tooth construction. In the present application I have shown teeth commonly referred to as twisted teeth. However, I propose to employ my improved machine and method for producing lock washers having various forms of warped, deflected, or twisted teeth, and it is only necessary to employ the particular type of forming or punching devices which are designed to produce the particular type of prong desired.

Having thus described my invention, what I claim as new and desire to obtain by Letters Patent is:

1. The method of producing lock washers which consists in flatwise coiling a section of serrated flat stock, and flattening said coiled section of stock so as to present a flat type washer with the serrations thereof projecting out of the plane of the stock for lockingly engaging a work piece.

2. The method of producing lock washers which consists in flatwise coiling a section of serrated flat stock with the serrations extending axially of said coil, and deflecting said stock laterally so as to present a flat type washer with said serrations projecting out of the plane of the stock for lockingly engaging a work piece.

3. The method of producing lock washers which consists in flatwise coiling a section of serrated flat stock with the serrations extending axially of said coil, and deflecting said stock inwardly so as to present a flat type washer with said serrations projecting out of the plane of the stock for lockingly engaging a work piece.

4. The method of producing lock washers which consists in flatwise coiling a section of serrated flat stock, positioning said serrations in substantially a common plane, and then warping said stock so as to present locking teeth projecting out of the plane of the stock for lockingly engaging a work piece.

5. The method of producing lock washers which consists in providing serrations along a margin of a strip of flat stock, flatwise coiling a section of said serrated stock, and flattening said coiled section of stock so as to present a flat type washer with the serrations thereof projecting out of the plane of the stock for lockingly engaging a work piece.

6. The method of producing lock washers which consists in severing a section from a strip of serrated washer stock, longitudinally shifting said severed section into a coiling die to produce a convolution flatwise of said stock, and flattening said convolution to present a flat type lock washer with teeth projecting out of the plane of the washer stock for lockingly engaging a work piece.

7. The method of producing lock washers which consists in flatwise coiling a section of serrated flat stock, conically forming said section so as to move the serrations inwardly, completely flattening said inwardly extending serrations so as to present them in substantially a common plane, and then warping the serrations to present work engaging teeth extending out of the plane of the washer stock.

8. A device for producing washers including a coiling mechanism for flatwise coiling a strip of stock fed thereto, means for shifting stock delivered to the coiling mechanism to enable a subsequent operation to be performed upon the stock, and means for subsequently flattening said coiled section of stock so as to present a flat type washer.

9. A device for producing washers including a coiling mechanism for flatwise coiling a strip of stock fed thereto, means for shifting the coiled section from said mechanism to enable a subsequent operation to be performed upon the stock, and means for subsequently shifting one margin of said coiled section into substantially the same plane as the other margin, whereby to present a flat type washer.

10. A device for producing washers including a coiling mechanism for flatwise coiling a section of flat stock, plunger mechanisms for shifting one margin of the coiled section of stock inwardly so as to present a flat type washer, and means for shifting the stock from the coiling mechanism to said plunger mechanism.

11. A device for producing lock washers including a coiling mechanism for flatwise coiling a strip of flat stock, an indexing mechanism having a recess for receiving material coiled by said mechanism, means for shifting said indexing mechanism, and means adapted to flatten the stock advanced from the coiling mechanism so as to present a flat type washer with the opposite ends thereof adjacently positioned.

12. A device for producing washers including coiling mechanism for receiving a section of serrated strip stock and for flatwise coiling said stock, shiftable means for receiving an advancing stock coiled by said mechanism, plunger mechanism for shifting the stock serrations inwardly so as to present a flat type washer, and means for warping the serrations so as to present work engaging teeth projecting out of the plane of the washer stock.

13. A device for producing washers including a mechanism for flatwise coiling a strip of stock fed thereto, means for shifting the coiled strip from said mechanism to enable a subsequent operation to be performed upon the stock, means for subsequently flattening said coiled strip so as to present a flat type washer, and means for swedging said flattened stock so as to effect the positive and continuous abutment of the stock extremities.

14. A device for producing washers including a mechanism for flatwise coiling a strip of stock fed thereto, means for shifting the coiled strip from said mechanism to enable a subsequent operation to be performed upon the coiled strip, means for flattening said coiled strip so as to present a flat type washer, and means for producing indentations on at least one surface of the washer to effect the elongation of the stock and thereby maintain the extremities thereof in abutting relation.

15. The method of producing lock washers which consists in feeding a strip of serrated material into a coiling mechanism to effect the flatwise coiling of the stock, shifting said coiled strip from said mechanism to another position, flattening said serrated strip so as to position all portions of the stock in a common plant, shifting said flattened material to another position, and then warping said serrations so as to present locking teeth projecting out of the plane of the washer stock.

16. The method of producing lock washers which consists in flatwise coiling a section of serrated flat stock, flattening said stock so as to position the serrations and the body of the stock in a substantially common plane and at the same time preventing an increase in the external diameter of the flattened stock, and warping the serrations to present work engaging teeth extending out of the plane of the washer stock.

17. The method of producing lock washers which consists in severing a section from a strip of serrated stock and forming said severed section into a convolution flatwise of the stock, flattening said convolution to present a flat type washer having marginal prongs, scoring the body portion of the flattened washer, and warping the prongs out of the plane of the washer stock to present work engaging teeth.

18. A device for producing lock washers including a coiling mechanism for flatwise coiling a strip of flat stock, a rotory device having a recess for receiving material coiled by said mechanism, means for indexing said rotary device to change the position of said recess, and means adapted to flatten the stock when said recess has been indexed.

In witness whereof, I have hereunto subscribed my name.

GEORGE C. TROTTER.